United States Patent [19]
Pitcher

[11] 3,885,809
[45] May 27, 1975

[54] VEHICLE SUSPENSION

[75] Inventor: Robert Hazell Pitcher, Leamington Spa, England

[73] Assignee: Automotive Products Co., Ltd., Leamington Spa, England

[22] Filed: Feb. 20, 1973

[21] Appl. No.: 333,647

[30] Foreign Application Priority Data
Mar. 8, 1972  United Kingdom............... 10802/72

[52] U.S. Cl.............................. 280/112 A; 280/104
[51] Int. Cl............................................. B60g 11/30
[58] Field of Search............ 280/112 A, 104, 124 F

[56] References Cited
UNITED STATES PATENTS
2,978,254  4/1961  Bundorf............................. 280/104
3,079,169  2/1963  Fiala.................................. 280/104
3,194,581  7/1965  Brueder.......................... 280/112 A Primary Examiner—Philip Goodman
Attorney, Agent, or Firm—Lawrence J. Winter

[57] ABSTRACT

A vehicle suspension in which the load of the vehicle is transmitted to each road wheel through liquid in a liquid-filled telescopic strut and in which liquid is supplied to or released from the struts automatically to counteract any tendency of the vehicle to roll due to transverse load transference when cornering has one pair of valves which control the supply of liquid to and the release of liquid from all the struts, the said valves being mounted in such relation to one pair of struts associated with one pair of vehicle wheels that the load changes at that pair of wheels control the roll resistance at one or more other pairs of wheels of the vehicle.

3 Claims, 3 Drawing Figures

VEHICLE SUSPENSION

This invention relates to vehicle suspensions, primarily for road vehicles such as passenger cars, although it may be applicable also to other forms of vehicle.

It has been proposed to provide a vehicle suspension which, in response to load changes due to the static loading of the vehicle, or to dynamic load changes resulting from a tendency to roll during cornering and/or a tendency to pitch due to weight transference in a fore-and-aft direction due to acceleration and deceleration, varies the quantity of liquid in liquid-filled struts through which the load of the vehicle is transmitted to the wheels so as to tend to maintain the vehicle at a predetermined height and in a level attitude.

The vehicle suspension according to the present invention may be applied to a vehicle, such as a road vehicle, in which the body is mounted directly on the road wheels by means of the suspension, or to a rail vehicle in which the body is mounted on bogies each comprising a frame mounted by means of the suspension on a plurality of track-engaging wheels. The term 'wheel-mounted structure' hereinafter used is to be understood as meaning either the body of a road vehicle or the bogie frame in the respective cases.

It is the object of the present invention to provide an improved suspension system for a wheel mounted structure having a plurality of pairs of wheels, of the kind in which the wheels are each connected to the wheel mounted structure by a liquid filled strut arranged to be connected through a valve responsive to relative up-and-down movement of the wheel and wheel mounted structure selectively to a source of liquid pressure and to a drain so as to oppose such relative up-and-down movement by forcing further liquid into, or allowing liquid to escape from, the strut.

According to the present invention there is provided a vehicle suspension system for a wheel mounted structure having a plurality of pairs of wheels each connected to the said structure by a liquid-filled strut including a chamber arranged to be connected selectively to a source of liquid pressure and to a drain so as to oppose relative up-and-down movement of the wheel-mounted structure relative to the said wheels, wherein two valves, each associated with the strut supporting the wheel mounted structure from one wheel of a first pair of wheels and each responsive to rolling motion of the wheel-mounted structure relative to that wheel control the selective connection to the source of liquid pressure and the drain of the chambers of that pair of struts, and of chambers of the struts of the pair or each pair supporting the wheel-mounted structure from another pair of wheels so that the relative load supporting thrust in the struts constituting a pair supporting the wheel-mounted structure from any pair of wheels other than said first pair is varied in the same sense as it is varied in the struts supporting the wheel-mounted structure from said first pair of wheels by the action of the valves in response to rolling of the wheel-mounted structure.

The chambers, the pressure in which is controlled by each valve may be all in struts associated with wheels on one side of the wheel-mounted structure, the said chambers being arranged so that liquid pressure therein acts in opposition to the load of the said structure.

Alternatively, the connections to the pressure source and drain of the chambers in the strut or struts of said pairs supporting the wheel-mounted structure from wheels of said other pair or pairs on one side of the said structure may be controlled by the valve which controls the corresponding connections of the chamber in the strut supporting the wheel-mounted structure from the wheel of the first pair on the opposite side of the said structure, the pressure in said chambers of the struts associated with said other pair or paris of wheels acting in the same direction as the load of said structure.

Some embodiments of vehicle suspension systems according to the invention will now be described with reference to the accompanying drawings in which.

Figure 1:
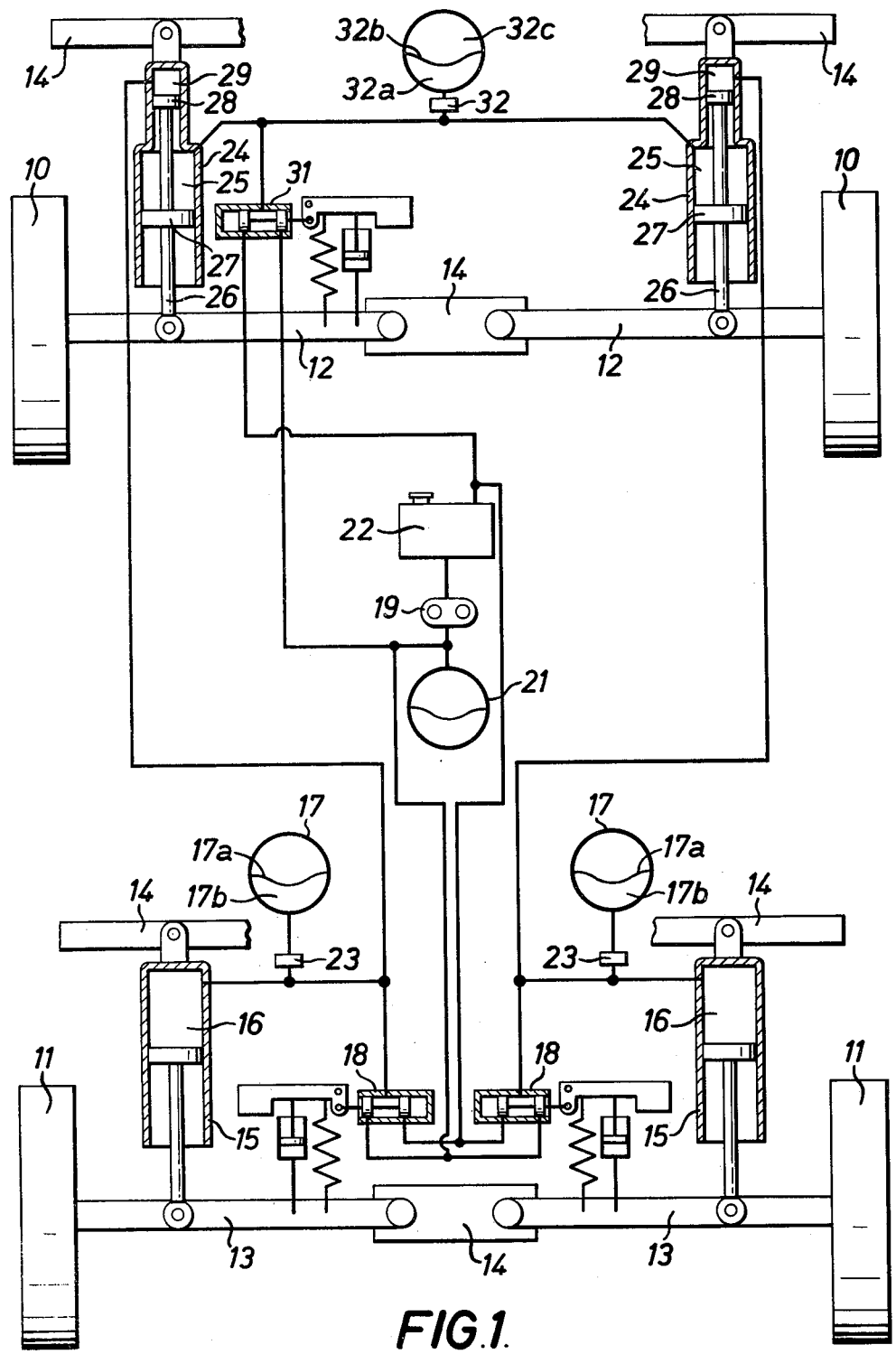
FIG. 1 is a diagram of one vehicle suspension system according to the invention.

Referring to FIG. 1 of the drawings, the diagram shows a suspension system for a four-wheeled vehicle, the front wheels being shown at 10 and the rear wheels at 11. Each front wheel is connected to the vehicle structure by radius arm 12 and each rear wheel is connected to the vehicle structure by a radius arm 13. It is to be understood that the radius arms 12 and 13 may be components of suspension linkages of any type. Various parts of the vehicle structure are indicated by the reference 14 and it is to be understood that these parts are all rigidly connected together.

Between each radius arm 13 and a part of the above mentioned vehicle structure there is mounted a telescopic strut 15 having a liquid filled chamber 16 through the liquid in which the load supported by that wheel is transmitted to an enclosed body of compressed gas in a chamber 17 and the liquid filled chamber is also connected to a valve 18, hereinafter described, acting to place the said chamber 16 selectively in communication with a source of liquid pressure, shown as a pump 19 and a liquid pressure accumulator 21, or with a drain leading to a low pressure reservoir 22.

The gas containing chambers 17 are separated by movable walls such as flexible diaphragms 17a from liquid containing chambers 17b connected to the chambers 16 through flow restricting valves 23 which provide damping of the relative movement of the wheels 11 and the vehicle structure 14.

Between each radius arm 12 and a part of the vehicle structure 14 there is mounted a telescopic strut 24 having a chamber 25 corresponding to a chamber 16 of a strut 15, each of the struts 24 including a ram unit 26 having a first head 27 acted on by the pressure of liquid in the chamber 25 and a second head 28 acted on by the pressure of liquid in a chamber 29 of the said strut which is connected to the chamber 16 of the strut 15 on the same side of the vehicle liquid pressure in the chamber 29 acting on the ram unit in the same direction as liquid pressure in the chamber 25. The chambers 25 are connected through a flow restricting valve 32 providing damping to a common liquid chamber 32a separated by a movable wall in the form of a diaphragm 32b from a gas-containing chamber 32c, and to a single valve 31, similar to the valve 18, through which the said chambers can be selectively connected to the pressure source 19, 21, or to the reservoir 22.

Figure 3:
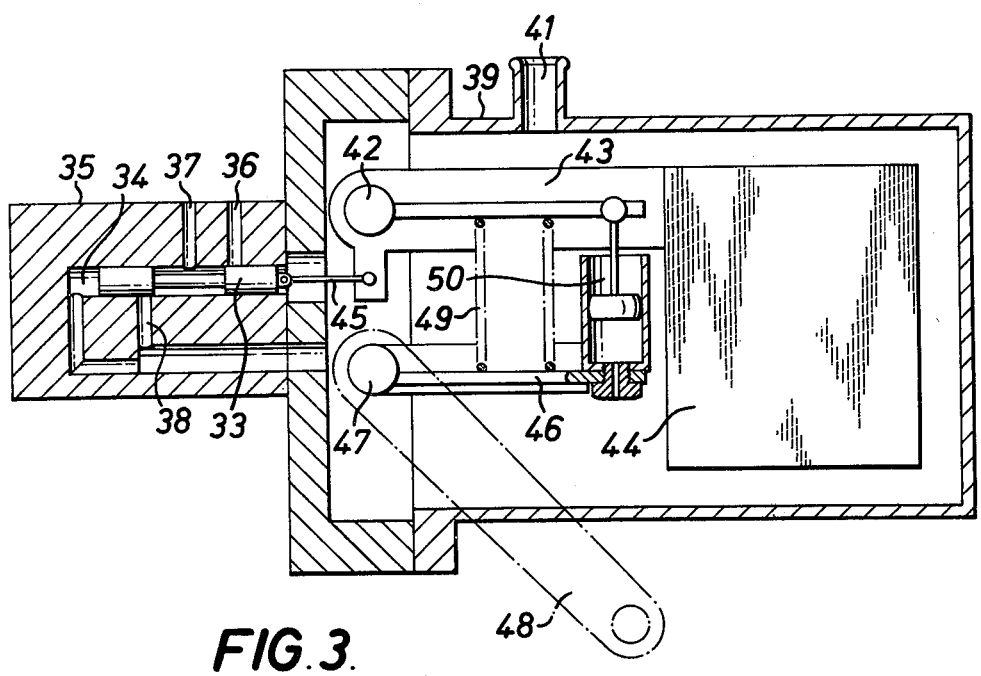
FIG. 3 is a sectional elevation of a valve embodied in both of the suspension systems described herein, the said valve being the subject of our U.S. Patent Specification No. 3,612,570.

Referring now to FIG. 3, which shows one of the valve units 18 or 31, the said valve unit comprises a spool 33 slidable in a bore 34 in a body 35 from which passages 36, 37 and 38 lead respectively to the source of pressure, the strut chamber or chambers 16 or 25 and to the interior of a casing 39 which is in turn connected through an opening 41 to the reservoir 22. In the casing 39 there is pivoted as 42 an L-shaped arm 43 a horizontally extending limb of which supports a weight 44 whilst a downwardly extending vertical limb is connected to the valve spool 33 by a pivoted link 45. A second arm 46 pivotally mounted in the casing 39 vertically below the pivot of the arm 43 is fixed to a shaft 47 extending outside the casing and having fixed to it, externally of the casing a further arm 48. The valve body 35 and casing 39 are fixed to the vehicle structure 14, and the further arm 48 is connected, by linkage not shown, to the associated radius arm 12 or 13, so that the second arm 46 moves about its pivot with vertical movement of the vehicle structure relative to the supporting wheels. Between the first and second arm 43 and 46 are mounted a compression spring 49 and a liquid damper 50, so that any pivotal movement of the second arm 46 causes pivotal movement of the first arm 43 to actuate the valve 18 or 31.

The pivotal axes of the arms 43 associated with the valves 18 extend parallel to the longitudinal axis of the vehicle, and the pivotal axes of the arm 43 associated with the valve 31 extends parallel to the transverse axis of the vehicle although for convenience it is shown parallel to the pivotal axes of the arms 43 in FIG. 1.

The arrangement is such that, when the vehicle changes direction, the chamber 16 of the strut 15 associated with the rear wheel 11 on the outer side of the curve of its path is connected to the pressure source. Additional liquid therefore tends to be supplied to that chamber 16. At the same time, the chamber 16 of the strut 15 associated with the rear wheel on the inner side of the curve of the vehicle path is connected to drain so that liquid tends to be drained therefrom. A roll reaction is thus created which acts to oppose rolling of the vehicle.

Since the chambers 29 in the struts 24 associated with the front wheels of the vehicle are each connected to the chamber 16 of the strut 15 associated with the rear wheel on the same side of the vehicle, liquid also tends to be supplied to the chamber 29 of the strut 24 associated with the front wheel on the outer side of the curve and to be released from the chamber 29 of the strut 24 on the inner side of the curve, so that a roll reaction is also set up at the front end of the vehicle, but under the control of the roll-creating forces at the rear wheels.

Since the pair of struts associated with the rear wheels control the roll reaction at the front wheels as well as that at the rear wheels they will be hereinafter referred to as the 'master' struts.

The chambers 25 of the struts 24 associated with the front wheels of the vehicle are, as already described, connected to a single valve 31 the arm 43 supporting the weight 44 of which is mounted to pivot about a transverse axis. The valve 31 does not therefore respond to lateral tilting of the vehicle, but does respond to longitudinal tilting, so that it controls the connections of the chambers 25 in the struts 24 to the pressure source 19, 21 and to the reservoir 22 in such a way as to oppose dipping of the front of the vehicle due to weight transference during braking.

In a four-wheeled vehicle, the master struts may be associated with the front wheels instead of with the rear wheels, and in a vehicle having more than two pairs of wheels, the master struts may be associated with any chosen pair of wheels, the master struts being connected to chambers such as 25 in struts such as 24 supporting the vehicle body from all or some of the other pairs of wheels.

Figure 2:
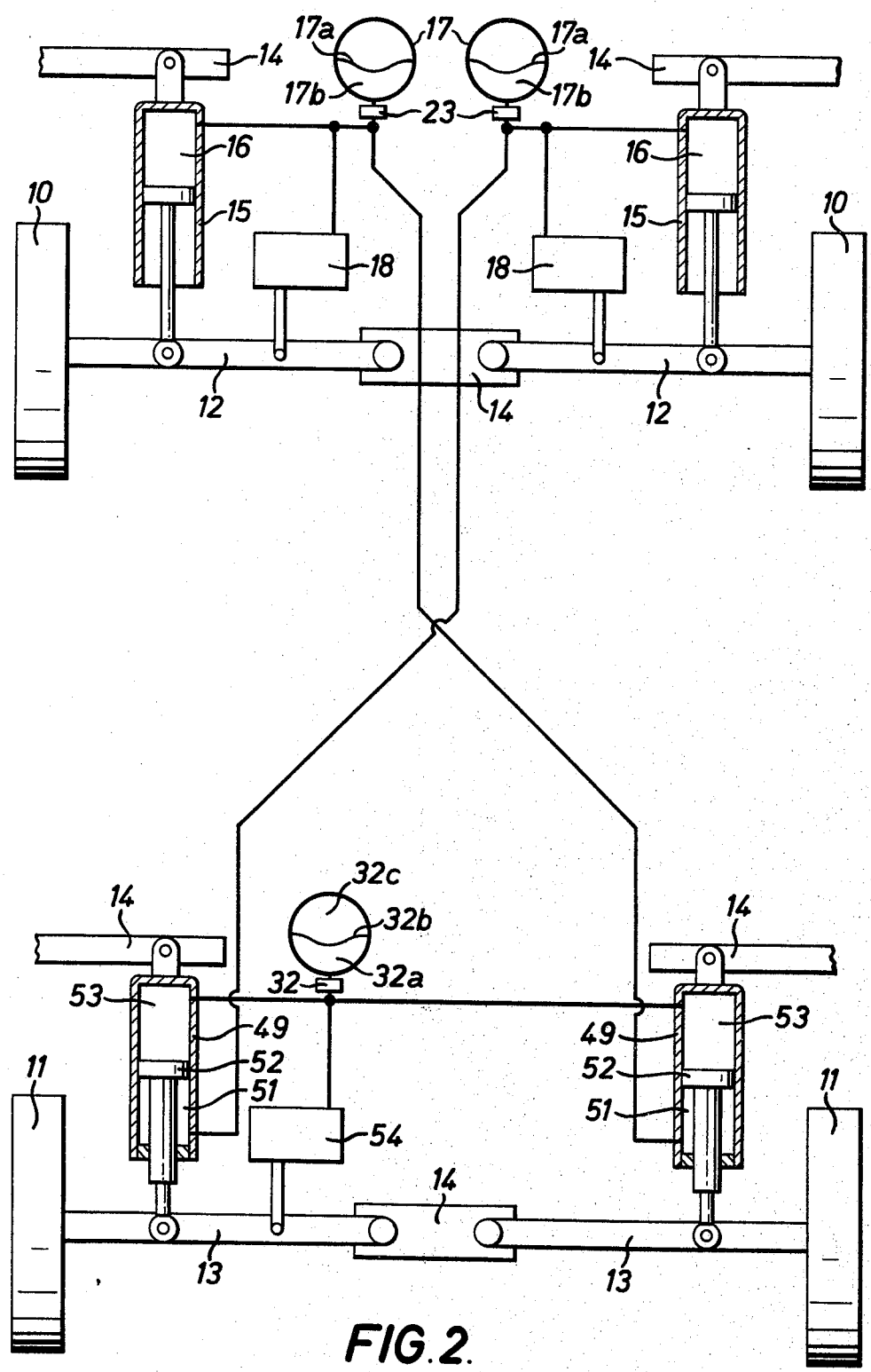
FIG. 2 is a similar diagram of another suspension system according to the invention.

In the modified suspension system shown in FIG. 2, the master struts 15 are associated with the front wheels 10 of the vehicle. Struts 49 associated with the rear wheels 11 include annular chambers 51 in which liquid pressure acts upwardly on plungers 52 to oppose the vehicle load supporting pressure acting in chambers 53 of the said struts, and the chambers 51 are respectively connected to the chambers 16 of the struts 15 on the opposite sides of the vehicle. Thus the increase of pressure transmitted from the master strut 15 associated with the front wheel of the vehicle on the outer side of a curved path of travel, instead of increasing the supporting pressure in the strut 49 on the same side of the vehicle, reduces the supporting pressure on the inner side, whilst the drop in pressure transmitted from the master strut 15 associated with the front wheel on the inner side of a curved path of travel increases the resultant supporting pressure in the strut 49 associated with the rear wheel on the outer side, thus having the same ultimate effect as does the previously described arrangement.

Damping of the movements of the vehicle structure 14 relative to the wheels 10 and 11 may be effected as in the suspension system shown in FIG. 1, by flow restricting valves, 23 and 32 arranged between the strut chambers 16 and 25 and liquid chambers 17b and 32a separated by diaphragms 17a and 32b respectively from compressed air containing chambers 17 and 32C.

With the suspension system shown in FIG. 2, any tendency of the front of the vehicle to dip during braking retardation, since it causes an increase in the pressure in the chambers 16 of the master struts 15, also causes an increase in the pressure in the chambers 51 of the struts 49, thus reducing the resultant load-supporting pressure at the rear wheels and so counteracting fore-and-aft tilting. The reverse effect occurs during acceleration. The chambers 53 of the struts 49 are connected to a valve 54, similar to the valve 18 and 31 but responsive only to changes of load of the vehicle.

Corresponding effects are obtained if the master struts 15 are associated with the rear wheels of the vehicle, the tendency of the rear of the vehicle to lift during braking, and the resulting reduction of pressure in the chambers 16, reducing the pressure in the chambers 51 of struts 49 associated with the front wheels so that the resultant load supporting thrust at the front of the vehicle is increased.

A modified suspension system having the master struts 15 cross-connected to the struts associated with another pair of wheels as described with reference to FIG. 2, may be applied to vehicles having more than two pairs of wheels.

Instead of damping of the relative movement of the vehicle structure 14 and the wheels 10, 11 being effected by restricting flow of liquid into and out of the liquid chambers of the struts 15 and 24 or 15 and 49, separate shock absorbers, for example of the telescopic type, may be provided between the radius arms 12,13 and the vehicle structure 14.

Whilst the invention has been described as applied to vehicles in which the vehicle body is mounted directly on the vehicle wheels, it may also be applied to vehicles where the body is mounted on bogies each having four or more wheels, the suspension system then constituting the mounting for the wheels on the bogies. The term "wheel mounted structure" used herein thus refers either to a vehicle body or to a bogie frame.

The degree of roll reaction provided under any given conditions at the pair or pairs of wheels other than the pair with which the master struts are associated is determined by the force tending to produce roll at the pair with which the master struts are associated. It may be found desirable to select as that pair of wheels the pair nearest to the longitudinal centre of gravity of the vehicle or "wheel mounted structure", but this is not essential or even desirable in all cases.

I claim:

1. A vehicle suspension system including a wheel mounted structure with a first and a second pair of wheels, first liquid filled struts with a chamber therein connecting one of said first pair of wheels with a source of liquid pressure and a drain source to oppose relative up and down movement of the wheel mounted structure and the wheel to which said strut is connected, valves connecting one of said first pair of wheels to said source of liquid pressure and drain source to produce roll resistance for said first pair of wheels, second liquid filled struts each having a first and second chamber connecting one wheel of said second pair of wheels to said wheel mounted structure, another valve in communication with the second chamber of said second struts selectively operatively connected to said second chamber and a source of pressure and drain source to connect either second chamber therewith, said first chambers being in open communication with the chamber of one of the struts of said first pair of wheels, whereby the pressure in said first chamber of each strut of the second pair of wheels varies with the pressure in the first chamber of one of the struts of the first pair of wheels, the arrangement being such that the changes of pressure in said second chambers produce roll resistance at the second pair of wheels in the same sense as the roll resistance produced at the first pair of wheels.

2. A vehicle suspension system according to claim 1, wherein the second chambers in the second struts are respectively connected to the chambers of struts of the first pair of wheels on the same side of the vehicle, liquid pressure in said second chamber of each strut of the second pair of wheels acting to oppose the load of the wheel-mounted structure.

3. A vehicle suspension system according to claim 1, wherein the second chambers in the second struts of the second pair of wheels are respectively connected to the chambers of struts of the first pair of wheels on opposite sides of the vehicle, liquid pressure in said second chambers of each strut acting in the same direction as the load of the wheel mounted structure.

* * * * *